United States Patent [19]

Freitag et al.

[11] 4,197,149
[45] Apr. 8, 1980

[54] METHOD FOR JOINING TOGETHER SHAPED BODIES OF POLYTETRAFLUOROETHYLENE

[75] Inventors: Günter Freitag, Frankfurt am Main-Höchst; Alfred Krahl, Eschborn II; Gerhard Ullmann, Gross-Gerau; Günter Wenzel, Kelkheim, all of Fed. Rep. of Germany

[73] Assignee: Sigri Elektrographit GmbH, Meitingen bei Augsburg, Fed. Rep. of Germany

[21] Appl. No.: 867,533

[22] Filed: Jan. 6, 1978

Related U.S. Application Data

[63] Continuation of Ser. No. 733,081, Oct. 18, 1976, abandoned.

[30] Foreign Application Priority Data

Nov. 5, 1975 [DE] Fed. Rep. of Germany ....... 2549475

[51] Int. Cl.² .................. B32B 31/20; B29D 23/01
[52] U.S. Cl. ................................... 156/154; 156/272; 156/282; 156/296; 156/304; 156/311; 156/333; 156/306.6; 156/308.2

[58] Field of Search ............... 156/154, 197, 158, 159, 156/272, 282, 296, 304, 306, 309, 311, 498, 502, 333, 386

[56] References Cited

U.S. PATENT DOCUMENTS

| 3,117,903 | 1/1964 | Hix ..................................... 156/158 |
| 3,356,551 | 12/1967 | Glenn et al. ...................... 156/158 X |
| 3,468,732 | 9/1969 | Hewitt .............................. 156/304 X |
| 3,574,804 | 4/1971 | Joonase ........................... 156/282 UX |
| 3,727,289 | 4/1973 | Bemelmann et al. ............. 156/304 X |
| 3,865,662 | 2/1975 | Segal ................................ 156/304 X |

FOREIGN PATENT DOCUMENTS 2163420 7/1973 France .

Primary Examiner—John T. Goolkasian
Assistant Examiner—Thomas Bokan
Attorney, Agent, or Firm—Herbert L. Lerner

[57] ABSTRACT

Method and apparatus for joining together edge surfaces of polytetrafluoroethylene material by a butt joint in which clamps along the abutting surfaces press together the abutting surfaces, heating means spaced from and out of direct contact with a strip between the clamps heats the strip by radiation or convection, and a cooling arrangement is provided via the clamps to remove heat from the clamping zone. A thin foil of a fluorine-containing thermoplastic inserted between the abutting surfaces facilitates joining of the surfaces.

14 Claims, 1 Drawing Figure

U.S. Patent
Apr. 8, 1980
4,197,149
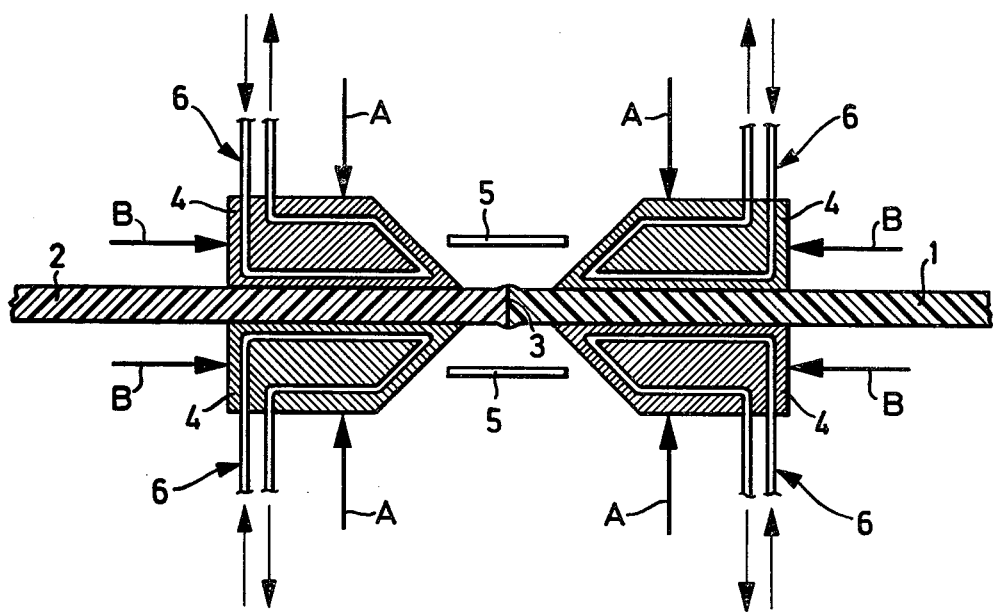

4,197,149

METHOD FOR JOINING TOGETHER SHAPED BODIES OF POLYTETRAFLUOROETHYLENE

CROSS REFERENCE TO RELATED APPLICATION

This is a continuation of application Ser. No. 733,081, filed Oct. 18, 1976, now abandoned.

Our cofiled application Ser. No. 733,073, filed Oct. 18, 1976 now abandoned and refiled as a continuation on Jan. 9, 1978 as Ser. No. 867,773 owned by the assignee of the present application, relates to joining together edge surfaces of polytetrafluoroethylene by confining the edges to be joined in abutting relationship in a chamber defined as an upper heating element and a lower heating element, respectively, above and below a strip of the polytetrafluoroethylene along both sides of the abutting surfaces, a clamping jaw on each side of the abutting surfaces, heating the abutting surfaces and subjecting the heated polytetrafluoroethylene to pressure qithin the chamber. In the present invention the edge surfaces of polytetrafluoroethylene are joined together by a butt joint by clamping the polytetrafluoroethylene on each side of the abutting surfaces except for a narrow unclamped strip along the abutting surfaces, pressing together the abutting surfaces, applying radiant or convection heat to the narrow strip by heating means out of direct contact with the strip, heating to a temperature above 327° C., removing heat from the clamping zone via the clamping, and continuing heating and pressing together to effect joining of the abutting surfaces.

Background of the Invention

1. Field of the Invention

This invention relates to a method and apparatus for joining together shaped bodies of polytetrafluoroethylene by a butt joint.

2. Description of the Prior Art

Shaped parts which consist of polytetrafluoroethylene (PTFE) or contain predominantly PTFE hereinafter designated polytetrafluoroethylene material are increasingly used as corrosion-resistant linings, as for example, for chemical apparatus such as heat exchangers, columns and vessels, because of their excellent thermal and chemical stability. In this connection, since fabrication of PTFE tubes of large diameter is not possible by ram or paste extrusion, it is necessary, particularly for equipment with a large inside diameter, to join together shaped parts, e.g., plates or foil to make them gas- and liquid-tight. Further difficulties are due to the fact that a separate press orifice is necessary for every diameter, and the ratio of wall thickness to diameter can be varied only within certain limits.

It has also not been possible to date to make cemented joints with a quality required, for example, for chemical apparatus, particularly with high thermal and chemical stability, because of the poor wettability of polytetrafluoroethylene and the comparatively low thermal and chemical stability of adhesives. Even if the PTFE surfaces to be joined together are first etched, the quality of the joint is not sufficient for the application mentioned. The welding methods commonly used for joining together conventional plastic materials, in which the pressed-together parts are heated above the melting or softening point, are not usable for polytetrafluoroethylene. However, overlapping joints between thin PTFE foils have been made by this method, but are not well suited for tank linings because of the extra material thickness at the overlap. The sealing of such seams, for example, at flanges, is particularly difficult and expensive if thicker foil or plates are used. Attempts to avoid such overlap points have been made according to the French Patent Application No. 2,163,420 by a method for making a joint between PTFE parts by a butt joint, in which the V-shaped seam gap between two PTFE plates fixed on a support is filled with a PTFE powder and the latter is heated by heating elements of stamp-like design, which are pressed on the joint. Sufficient and reproducible welding quality which depends, among other factors, on the quality and grain of the powder as well as on the packing density in a complicated manner, can be achieved by this process only if all the factors influencing the operation are obtained, which is hardly possible under normal operating conditions. The asymmetrical temperature distribution in the material to be welded, caused by the arrangement of the support underneath the weld results in unfavorable welding quality.

SUMMARY OF THE INVENTION

An object of the present invention is to provide a method for making a butt joint of high welding quality suitable for shaped bodies of PTFE of any thickness and size. A further object of the invention is to provide efficient apparatus for carrying out the joining method.

With the foregoing and other objects in view, there is provided in accordance with the invention a method for joining together edge surfaces of polytetrafluoroethylene material by a butt joint, which includes placing the polytetrafluoroethylene edge surfaces to be joined in abutting relationship, clamping the polytetrafluoroethylene material by clamping means on each side of the abutting surfaces except for a narrow unclamped strip along the abutting surfaces, pressing-together the abutting surfaces, applying heat selected from the group consisting of radiant heat or convection heat to the narrow unclamped strip by heating means maintained out of direct contact with the strip, heating the strip to a temperature above 327° C., removing heat from the clamping zone via a clamping means, and continuing the heating, and the pressing-together to effect joining together the abutting surfaces.

In accordance with the invention, there is provided apparatus for joining together edge surfaces of polytetrafluoroethylene material by a butt joint, includes clamping jaws for clamping the polytetrafluoroethylene material on each side of the abutting surfaces to be joined, clamping jaws on at least one side of the abutting surfaces movable in a direction toward the butt joint for controlling the contact pressure of the abutting surfaces during joining of the surfaces, cooling means for controlled removal of heat from the clamped area of polytetrafluoroethylene, and heating means spaced from and out of direct contact with a strip of polytetrafluoroethylene between the clamping jaws on each side of the abutting surfaces to be joined for heating the strip by radiant or convection heat.

BRIEF DESCRIPTION OF THE DRAWING

Other features which are considered as characteristic for the invention are set forth in the appended claims.

Although the invention is illustrated and described herein as embodied in method and apparatus for joining together shaped bodies of polytetrafluoroethylene, it is nevertheless not intended to be limited to the details shown, since various modifications may be made therein without departing from the spirit of the invention and within the scope and range of equivalents of the claims.

The construction and method of operation of the invention, however, together with additional objects and advantages thereof will be best understood from the following description when read in connection with the accompanying drawing, which diagrammatically illustrates in sectional view the clamping jaws provided with a cooler arrangement, and a heat radiator for joining together abutting edges of polytetrafluoroethylene by a butt joint in accordance with the present invention.

DETAILED DESCRIPTION OF THE INVENTION

The polytetrafluoroethylene bodies to be joined together are clamped, except for a narrow strip which includes the abutting surfaces, between clamping jaws provided with cooling arrangements. The strip is heated, without making direct contact with the heating element which is the source of heat, by radiation and/or convection to a temperature above 327° C. Heat is removed, at least in part, from the clamping zone via the clamping jaws. By pressing the abutting surfaces together, a thickening of the seam is produced, which is subsequently machined off to remove surface notches.

For producing a high-quality joint, it is necessary to heat the abutting surfaces under pressure to a temperature of the melting point of PTFE crystallites and to let the temperature and the pressure act on the joint surfaces until a thickening of the seam has been produced. The temperature distribution in the heated PTFE strip which protrudes unsupported between the clamping jaws should avoid buckling of the PTFE strip. Melting zones that are too wide or too narrow are not desired. Thus regardless of the respective geometric shapes or dimensions of the bodies to be joined together, a melting zone of adequate width to be self sustaining is produced and maintained for the duration of the welding process. The thickened seam is machined off, for example, by planing or dressing to remove unwanted surface notches. In carrying out the method of the present invention, it was found surprisingly that the PTFE melted in the vicinity of the abutting surfaces does not drop off or flow out in spite of the relatively high pressure and long reaction times that are applied for producing a high-quality joint. The unexpected mechanical stability of the melt is likewise the basis for a simple and very flexible device for carrying out the method according to the invention.

In a preferred embodiment of the invention, the abutting surfaces are heated to a temperature between about 340° and 430° C. Below this temperature range, the welding times required are relatively long, while above the range, very short welding times can be obtained but high temperatures increase the possibility of partial decomposition of the polytetrafluoroethylene. The contact pressure and the welding times are preferably 60 to 300 N/cm$^2$ and 10 to 120 min., respectively. Where the parameters temperature, pressure and time have a similar effect up to a certain degree, a low value of one parameter can be compensated by increasing the othr parameters in this substitution range. It is furthr advantageous, for obtaining a uniform temperature distribution in the butt joint, to let the width of the PTFE strip heated to a temperature above the melting temperature be in a definite ratio to the thickenss of the bodies to be joined together. Favorable results are obtained with a ratio of about 0.2:1 to 3:1, desirably about 0.8:1 to 1.2:1 and, in particular, 1:1.

The method of the invention is suitable for joining together PTFE bodies of the most varied shapes and dimensions, and in particular, bodies having a thickness between about 1 and 10 mm. In one advantageous embodiment of the invention, thin foils of a fluorine-containing thermoplastic are inserted between the abutting surfaces, for example, foil of tetrafluoroethylene-hexafluoropropylene copolymerisates (FEP) or of a copolymer of tetrafluoroethylene and perfluoroalkyl-perfluorovinyl ether (PFA). Such thin intermediary layers make possible a reduction of the welding time to preferably 1 to 10 minutes or, a lowering of the pressure and/or temperature without thereby appreciably degrading the chemical and thermal stability of the joint. PFA foil used as the intermediary layer gives particularly advantageous results. The pressure acting on the abutting surfaces under these conditions is preferably 2 to 100 N/cm$^2$.

Apparatus for carrying out the method according to the invention consists of clamping jaws which hold and press together the polytetrafluoroethylene bodies and which are provided with cooling arrangements for the controlled removal of the excess heat from the heated polytetrafluoroethylene strip and, for controlling the contact pressure during the welding process. The clamping jaws are movable in at least one direction substantially perpendicular to the abuttin surface. Heat radiators, e.g., in the form of heating ribbons or heating wires, are arranged between the pairs of clamping jaws along the weld, for the contactless heating of the exposed PTFE strip; or hot gases, particularly air heated in a heater placed a distance from the PTFE surface, are blown onto the PTFE surface into the gap formed by the pair of clamping jaws, for heating the exposed strip. The PTFE bodies are advantageously clamped in such a manner that the pressed-together abutting surfaces are approximately away from each of the clamping jaw pairs by the same distance. The shape of the abutting surfaces and the layout of the welded seam may vary appreciably and the abutting surfaces may intersect the surface of the body at any angle or may be of concave or convex shape or may have any desired profile. The welded seams in their lengthwise direction, may be straight or curved. Also the abutting surfaces may be serrated over the entire length of the welded seam or only in certain sections. The pressure required to weld the PTFE parts together is supplied from the outside. This pressure, taking into consideration the thermal expansion of the PTFE strip, is held at a definite magnitude and is changed during the welding time in accordance with a predetermined program. Compartmentalization of the free PTFE strip is not necessary even though the temperature is above the melting point and the pressure is maintained over an extended period of time, as, particularly because of the controlled temperature distribution in the strip, only very narrow zones on both sides of the abutting surfaces are softened. The absence of compartmentalization permits heating of the polytetrafluoroethylene by simple heat radiators or heated gases and thus simplifies the joining method.

The apparatus is suited also for joining together other thremoplastic materials, particularly fluorine-containing thermoplastics with a higher softening point and high-melting polymers, such as, for example, polyimides. The process parameters for the individual plastics such as temperature, pressure and time, can be determined in each case.

The method in accordance with the invention makes it possible in a simple manner to prepare butt joints with tightly bonded material of shaped bodies of PTFE with different geometric shapes such as plates, rods, foil, hollow cylinders, hollow cones and the like. The quotient, called welding factor, of the tensile strength of the joint determiined at room temperature and the tensile strength of the solid starting material is almost 1. The welded seams do not adversely affect the permeability of a hollow shape fabricated by joining several PTFE parts and likewise, the resistance of PTFE to corrosive substances is not changed by the joint. Further advantages of the method are the excellent reproducibility, the uniform quality of the seam and, finally, the simple handling.

In the drawing a cross section through a welding device is shown schematically. Numerals 1 and 2 indicate two PTFE bodies which are to be joined together and are pressed together at the butt joint 3, and which are held by the clampiing jaw parts 4. The clamping forces are represented by the arrows A. To supply the necessary welding pressure, the jaws 4 are movable in the direction toward the butt joint 3 and press the abutting surfaces together by means of a force B generated in any suitable manner as for example by springs, hydraulically or by weights. Between the clamping jaws, heat radiators 5 are arranged for heating the polytetrafluoroethylene in the vicinity of the butt joint 3. To control the temperature distribution in the welding and clamping zone, the clamping jaws 4 contain cooling arrangements 6 which may be passageways through which a cooling media with a high heat capacity flows or the heat capacity of the clamping jaws may be sufficiently large to maintain a given temperature distribution between the clamping jaws and the butt joint.

The following examples illustrate the present invention:

EXAMPLE 1

For lining a funnel with opening diameters of 1400 mm and 500 mm, respectively, and a height of 1000 mm, a PTFE foil 4 mm thick, which had been cut to size and planed off at the butt surfaces was clamped into the apparatus as shown in the drawing in such a manner that the butt joint was about equally far away from the pairs of clamping jaws and extended parallel to the jaws. The distance between the clamping jaws was 10 mm. The zone on both sides of the butt joint was heated by the heat radiators to about 400° C., wherein equilibrium existed between the energy supplied in the about 5 mm wide welding zone and the energy removed by conduction via the clamping jaws. The temperature and a pressure of 120 H/cm² were maintained for 40 min. and the welding zone was then cooled down under pressure to room temperature. The thickening of the seam, which had developed on both sides of the butt joint was then planed off and a surface free of notches created. As compared with unwelded PTFE, the welded seam had the following properties:

Breaking strength <0.8
Breaking elongation <0.9.

EXAMPLE 2

A pared foil 3 mm thick, intended for lining a hollow cylinder, the diameter of which was 1600 mm and the length of which was 1200 mm, was cut to size and, after the butt surfaces were planed off, was clamped into the apparatus shown in the drawing as described in Example 1. A thin PFA foil was inserted between the abutting surfaces. The welding zone was then heated under a pressure of 20 N/cm² to a temperature of about 350° C. and the pressure and the temperature were maintained for 5 min. After cooling down, the bead-shaped enlargement in the vicinity of the butt surfaces was dressed. The properties of the cold welded seam were as follows:

Breaking strength 0.9
Breaking elongation 0.95.

There are claimed:

1. Method for joining together edge surfaces of polytetrafluoroethylene material by a butt joint, which comprises the steps of:
   (a) placing the polytetrafluoroethylene edge surfaces to be joined in abutting relationship;
   (b) clamping the polytetrafluoroethylene material by clamping means containing cooling channels on each side of the abutting surfaces except for a narrow unclamped strip along the abutting surfaces;
   (c) pressing-together the abutting surfaces;
   (d) applying heat selected solely from the group consisting of radiant heat or convection heat to the narrow unclamped strip by heating means maintained out of direct contact with said strip;
   (e) heating the abutting surfaces of said strip to a temperature above 327° C.;
   (f) applying a cooling media to the cooling channels to cause a controlled temperature distribution in the strip to avoid buckling of the strip;
   (g) continuing said heating and cooling to produce a thickening of the seam formed between said abutting surfaces; and
   (h) cooling the resultant butt joint and removing surface notches by machining off said thickening.

2. Method according to claim 1, wherein said heat is radiant heat.

3. Method according to claim 1, wherein said heat is convection heat.

4. Method according to claim 1, wherein the abutting surfaces are heated to a temperature between 340° and 430° C.

5. Method according to claim 1, wherein the abutting surfaces are pressed against each other with pressures between 60 and 300 N/cm².

6. Method according to claim 1, wherein the temperature and the pressure in the butt joint are maintained for 10 to 120 minutes.

7. Method according to claim 1, wherein the width of the heated strip is 0.2 to 3 times the thickness of the polytetrafluoroethylene material.

8. Method according to claim 7, wherein the width of the heated strip is 0.8 to 1.2 times the thickness of the polytetrafluoroethylene.

9. Method according to claim 1, wherein the polytetrafluoroethylene material has a thickness of 1 to 10 mm.

10. Method according to claim 1, wherein a thin foil of a fluorine-containing thermoplastic is inserted between the abutting surfaces.

11. Method according to claim 10, wherein said thin foil is a foil of tetrafluoroethylene-hexafluoropropylene copolymerisate.

12. Method according to claim 10, wherein said foil is a foil of a copolymer of tetrafluoroethylene and perfluoroalkylperfluorovinyl ether.

13. Method according to claim 10, wherein the abutting surfaces are pressed against each other with a pressure of 2 to 100 N/cm².

14. Method according to claim 13 wherein the temperature and the pressure in the butt joint are maintained for 1 to 10 minutes.

* * * * *